United States Patent
Kim et al.

(10) Patent No.: US 7,178,016 B2
(45) Date of Patent: Feb. 13, 2007

(54) COMPUTER SYSTEM AND METHOD OF BOOTING THE SAME ON SET TIME

(75) Inventors: In-soo Kim, Seoul (KR); Kyung-young Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 484 days.

(21) Appl. No.: 10/813,125

(22) Filed: Mar. 31, 2004

(65) Prior Publication Data
US 2004/0230786 A1 Nov. 18, 2004

(30) Foreign Application Priority Data
May 14, 2003 (KR) .................. 10-2003-0030659

(51) Int. Cl.
G06F 9/00 (2006.01)
G06F 9/24 (2006.01)

(52) U.S. Cl. .............................. 713/1; 713/2

(58) Field of Classification Search .............. 713/1, 713/2
See application file for complete search history.

(56) References Cited

U.S. PATENT DOCUMENTS

| | | | |
|---|---|---|---|
| 4,998,099 A | 3/1991 | Ishii | 340/784 |
| 5,426,775 A * | 6/1995 | Boccon-Gibod | 714/36 |
| 5,557,784 A | 9/1996 | Dayan et al. | |
| 5,786,801 A | 7/1998 | Ichise | 345/102 |
| 5,818,553 A | 10/1998 | Koenck et al. | 349/61 |
| 5,995,454 A * | 11/1999 | Yamaki | 368/10 |
| 6,144,359 A | 11/2000 | Grave | 345/102 |
| 6,330,676 B1 * | 12/2001 | Kelsey | 726/7 |

FOREIGN PATENT DOCUMENTS

| | | |
|---|---|---|
| JP | 5-233107 | 9/1993 |
| JP | 61-68619 | 6/1994 |
| JP | 10-149233 | 6/1998 |

OTHER PUBLICATIONS

PCT International Search Report for PCT/KR2004/001716 filed Jul. 12, 2004
PCT International Search Report for PCT/KR2004/001713 filed Jul. 12, 2004.
Communication for Korean Application No. 10-2003-0030659.

* cited by examiner

*Primary Examiner*—Thomas Lee
*Assistant Examiner*—Ji H. Bae
(74) *Attorney, Agent, or Firm*—Staas & Halsey LLP

(57) ABSTRACT

A computer system including a clock module with predetermined set limits; a compensator; a booting setting part to store a user set time as a comparative set time in the compensator; wherein the booting setting part stores the user set time as a booting set time in the clock module in response to the user set time being within the set limits, and stores a time within the set limits as the booting set time in response to the user set time being beyond the set limits; and wherein the compensator allows the computer system to be booted at the booting set time in response to the booting set time being equal to the comparative set time, and compensates the booting set time so that it corresponds with the comparative set time in response to the booting start time being different from the comparative set time.

15 Claims, 4 Drawing Sheets

COMPUTER SYSTEM AND METHOD OF BOOTING THE SAME ON SET TIME

CROSS-REFERENCE TO RELATED APPLICATIONS

This application claims the benefit of Korean Patent Application No. 2003-030659, filed May 14, 2003, in the Korean Intellectual Property Office, the disclosure of which is incorporated herein by reference.

BACKGROUND OF THE INVENTION

1. Field of the Invention

The present invention relates to a computer system and a method of booting the same on a set time.

2. Description of the Related Art

There is a computer system capable of being automatically booted on a set time, which is disclosed in Korean Utility Model First Publication No. 1998-045452. As shown in FIG. 1, in the conventional computer system capable of being automatically booted on the set time, an automatic power management section comprises a clock module 101, a power control module 102, and a main system 103.

The clock module 101 generates a power control signal on the time of power-on/off set by a user. The power control module 102 controls the main system 103 to be turned on/off in response to the power control signal generated by the clock module 101.

Generally, the clock module 101 includes an RTC (Real Time Clock) which is relatively simple and inexpensive. However, the RTC has a register to store information on only time. The RTC is not able to store date information, so the allowable set time is limited to within twenty-four hours. For example, if the set time is stored in the register of the RTC, the RTC generates a setting control signal on the set time everyday regardless of the date. Hence, although a user wants to set the computer system to be automatically booted after the twenty-four hours has elapsed, it is impossible because the allowable set time is limited within twenty-four hours.

This problem can be solved by replacing the clock module 101 with a microprocessor, but this solution is not economically desirable.

SUMMARY OF THE INVENTION

Accordingly, it is an aspect of the present invention to provide a computer system and a method of booting the same on a set time, in which the set time is not limited, though only a clock module such as an RTC, of which the set time is limited, is used without an additional module such as a microprocessor.

Additional aspects and/or advantages of the invention will be set forth in part in the description which follows and, in part, will be obvious from the description, or may be learned by practice of the present invention.

The foregoing and/or other aspects of the present invention are achieved by providing a computer system having a power supply to supply electric power, the computer system comprising a power controller to control the power supply to supply the electric power to the computer system; a clock module, having predetermined set limits, to output a control signal to the power controller so that the power supply supplies the electric power to the computer system on a booting set time; a booting compensator to allow the computer system to continue being booted in response to a booting start time being equal to a comparative set time which is previously stored, and to compensate the booting set time so that it corresponds with the comparative set time, and to stop the booting of the computer system, in response to the booting start time being different from the comparative set time; and a booting setting part to receive a user set time from a user; wherein the booting setting part stores the user set time as the booting set time in the clock module, and as the comparative set time in the booting compensator, in response to the user set time being within the set limits, and stores the user set time as the comparative set time in the booting compensator, and a wakeup time within the set limits as the booting set time in the clock module, in response to the user set time being beyond the set limits.

According to an aspect of the invention, the booting compensator may store the comparative set time as the booting set time in response to the comparative set time being within the set limits, and may store the wakeup time as the booting set time in response to the comparative set time being beyond the set limits, in response to the booting start time being different from the comparative set time.

According to an aspect of the invention, the clock module may include an RTC having a register to store the booting set time.

According to an aspect of the invention, the booting compensator may be provided in a BIOS.

According to an aspect of the invention, the booting setting part may receive information on the user set time together with a predetermined program selected by a user, so that the program can be automatically executed after the computer system is completely booted.

According to another aspect of the present invention, the above and other aspects may be also achieved by providing a method of booting a computer system having a power supply to supply electric power, a power controller to control the power supply, an RTC to control the power controller to supply the electric power on a booting set time which is preset within predetermined set limits, and a BIOS, wherein the method comprises receiving a user set time input by a user; storing the user set time as the booting set time and as a comparative set time in the RTC and the BIOS, respectively, in response to the user set time being within the set limits, and storing the user set time as the comparative set time in the BIOS and a wakeup time within the set limits as the booting set time in the RTC in response to the user set time being beyond the set limits; booting the computer system with the electric power as the RTC outputs a control signal on the booting set time; comparing the booting set time with the comparative set time; and allowing the computer system to continue being booted in response to the booting set time being equal to the comparative set time.

According to an aspect of the invention, the comparing the booting set time with a comparative set time may comprise storing the comparative set time as the booting set time in response to the comparative set time being within the set limits, and storing the wakeup time as the booting set time in response to the comparative set time being beyond the set limits, in response to the comparative set time being different from the booting set time.

BRIEF DESCRIPTION OF THE DRAWINGS

These and/or other aspects and advantages of the invention will become apparent and more readily appreciated from the following description of the preferred embodiments, taken in conjunction with the accompany drawings of which.

DETAILED DESCRIPTION OF THE PREFERRED EMBODIMENTS

Figure 1:
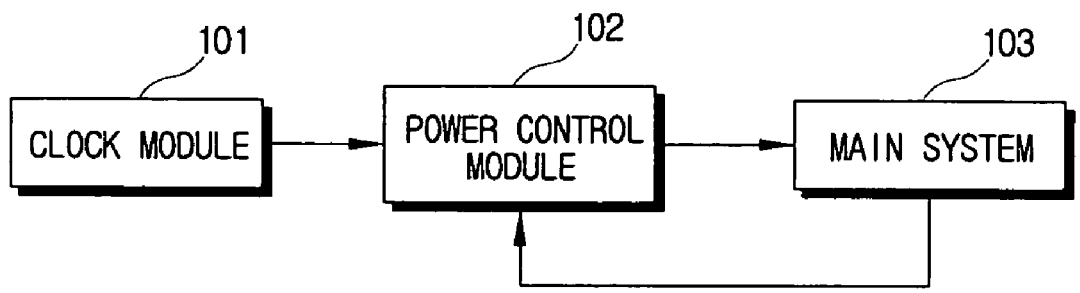
FIG. 1 is a control block diagram of an automatic power controller in a conventional computer system capable of being automatically booted on a set time.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Hereinafter, a user set time indicates a time which is set by a user as desired. A comparative set time indicates a time which is based on the user set time and stored in a memory, so that it is employed in comparing a booting start time with an absolute time or a relative time as a remained time relative to the user set time. A booting set time indicates a time which is stored in a clock module, and on which the clock module controls a power controller to start a booting procedure.

Figure 2:
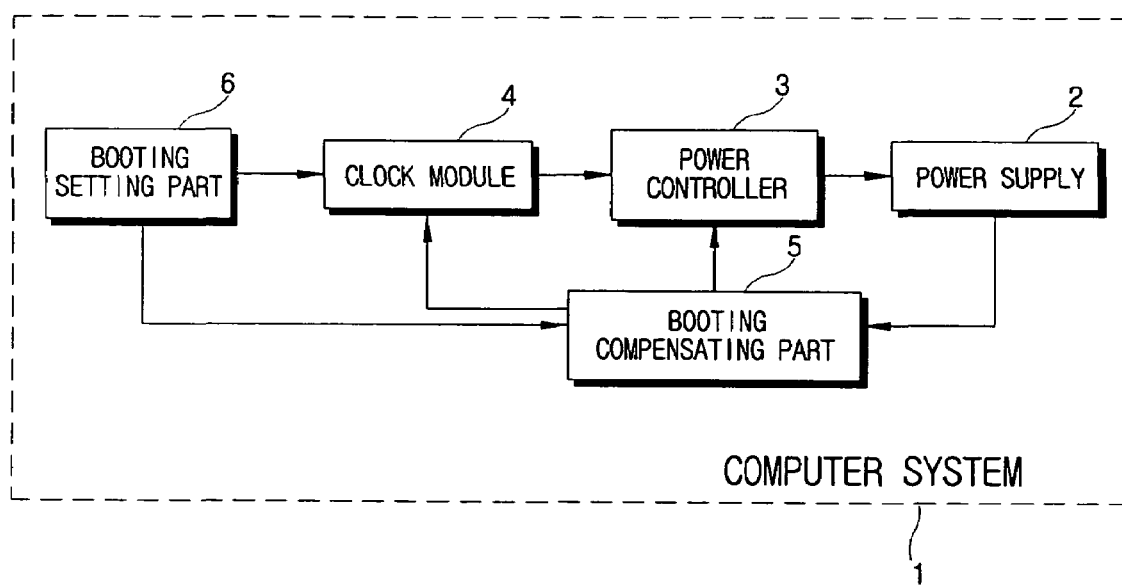
FIG. 2 is a control block diagram of a computer system according to an embodiment of the present invention.

FIG. 2 is a control block diagram of a computer system according to an embodiment of the present invention.

The computer system 1 according to this embodiment of the present invention comprises a power supply 2, a power controller 3, a clock module 4, a booting compensator 5, and a booting setting part 6.

The power supply 2 supplies electric power to the computer system 1 in response to a control signal of the power controller 3.

The clock module 4 checks whether a current time has reached the booting set time, which is preset within predetermined set limits, and outputs a control signal to the power controller 3 on the booting set time to turn on the computer system 1. Preferably, the clock module 4 includes a simple and economical module such as an RTC having a register, and does not include a microprocessor. However, the RTC has a register to store information on only time, so that it is unable to store and not date information, and therefore an allowable set time is limited to within twenty-four hours. Therefore, the RTC generates the control signal on the set time stored in the register every day until the set time is deleted from the register.

The booting compensator 5 allows the computer system 1 to continue being booted when the booting start time is equal to the user set time, and compensates the booting set time, stopping the booting of the computer system 1, when the booting start time is different from the user set time. That is, in the case where the comparative set time, stored as the user set time, in the booting compensator 5 is different from the booting start time, the booting set time is treated as the comparative set time when the compensated booting set time is within the set limits, and is treated as a predetermined wakeup time when the compensated booting set time is beyond the set limits. Here, the wakeup time can be set as the set limits of the clock module 4, as a time at a setting point within those set limits, and so on. With regard to economy of electric power, the booting compensator 5 is preferably operated by a BIOS (Basic Input/Output System) before an OS (Operating System) of the computer system is booted.

The booting setting part 6 receives the user set time input by a user, and stores it as the booting set time corresponding to the duration of the user set time. That is, in the case where the user set time is within the set limits of the clock module 4, the user set time is stored as the booting set time and as the comparative set time in the clock module 4 and the booting compensator 5, respectively. Conversely, in the case where the user set time is beyond the set limits of the clock module 4, the user set time is stored as the comparative set time in the booting compensator 5, and the wakeup time within the set limits is stored as the booting set time in the clock module 4. Further, the booting setting part 6 can receive information on the user set time together with a predetermined program when the setting is performed by a user, so that the program can be automatically executed after the computer system 1 is completely booted. For example, the booting setting part 6 can be realized by a program such as a scheduler.

Figure 3:
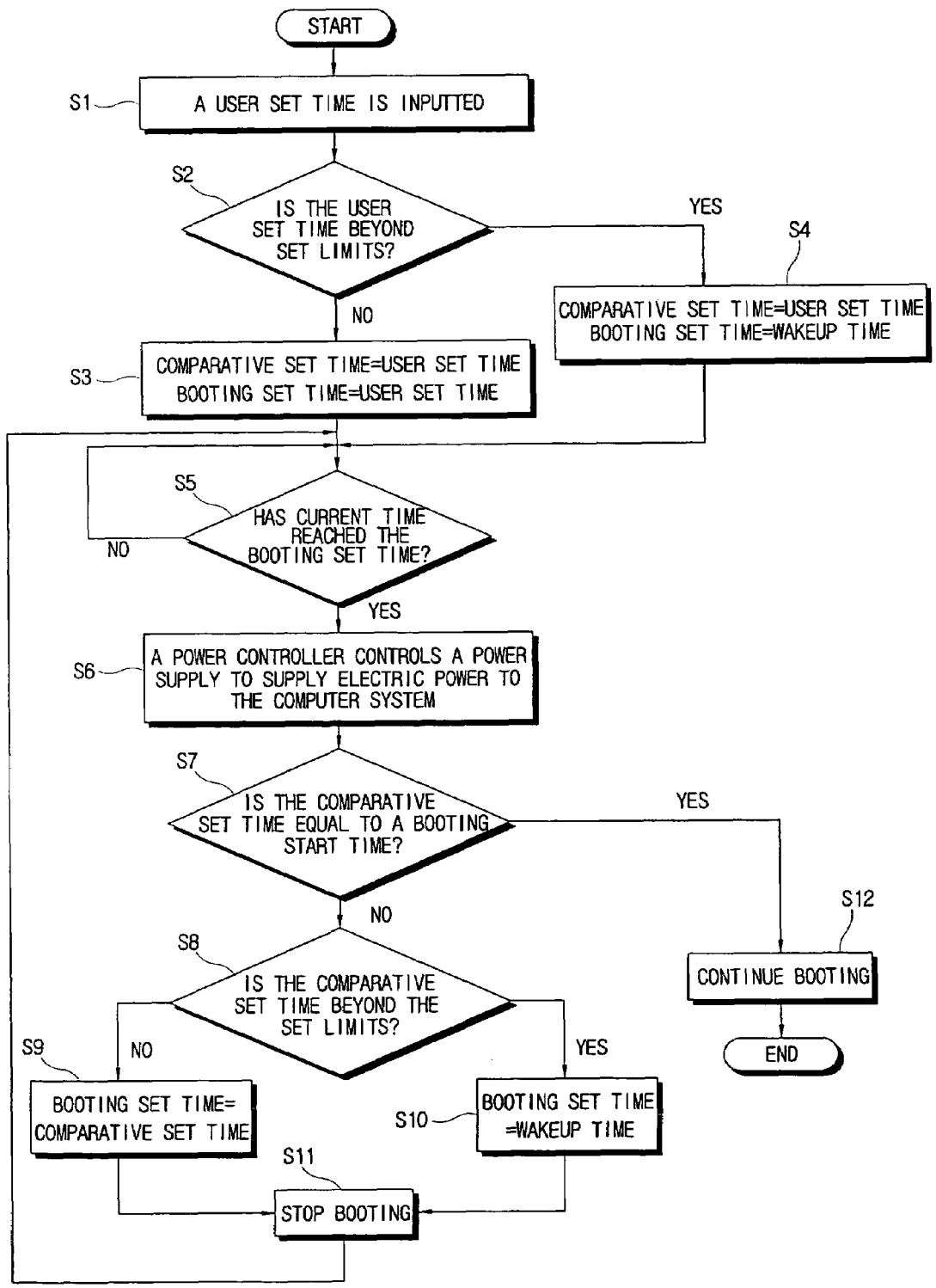
FIG. 3 is a flowchart of a booting method according to an embodiment of the present invention.

Referring to FIG. 3, a method of booting the computer system 1 according to an embodiment of the present invention will be described hereinbelow.

At operation S1, the booting setting part 6 receives the user set time from a user. At operation S2, it is determined whether the user set time is beyond the set limits of the clock module 4. When the user set time is within the set limits, at operation S3, the user set time is stored in the clock module 4 as the booting set time. When the user set time is beyond the set limits, at operation S4, a predetermined wakeup time is stored in the clock module 4 as the booting set time. At both operations S3 and S4, the user set time is stored as the comparative set time in the booting compensator 5, regardless of the set limits.

At operation S5, it is determined whether a current time has reached the booting set time. When the current time reaches the booting set time, at operation S6, the clock module 4 generates the control signal to the power controller 3, thereby controlling the power supply 2 to supply the electric power to the computer system 1 so as to start booting the computer system 1. At operation S7, the booting compensator 5 determines whether the booting start time is equal to the user set time or not. When the booting start time is equal to the user set time, i.e., the comparative set time, at operation S12, the booting compensator 5 allows the computer system 1 to continue being booted.

Conversely, when the comparative set time is different from the booting start time, the booting compensator 5 compensates the booting set time. Therefore, in the case where the comparative set time is different from the booting start time, at operation S8, it is determined whether the comparative set time is beyond the set limits or not. When the comparative set time is within the set limits, at operation S9, the comparative set time is stored as the booting set time in the clock module 4. Conversely, when the comparative set time is beyond the set limits, at operation S10, the wakeup time is stored as the booting set time.

After the compensation of the booting set time is finished, at operation S11, the computer system 1 stops being booted, and then returns to the operation S5.

A method of booting the computer system 1 employing the RTC having the set limits of twenty-four hours as the clock module will now be described by way of example.

If, at 5 P.M. today, a user sets the computer system 1 to be automatically booted at 11 P.M. on the next day, in other words, after thirty hours has elapsed, the booting setting part 6 receives the date and time as the user set time from the user at the operation S1. The booting setting part 6 then determines whether the user set time is beyond the set limits of twenty-four hours, at the operation S2.

Here, because the user set time is beyond the set limits, at the operation S4, the user set time is stored as the comparative set time in a BIOS ROM (Read Only Memory), and the wakeup time is stored in the register of the RTC. Here, the wakeup time can be set as the set limits (twenty-four hours), as the time (17:00) of the setting point of time, and so on. In this embodiment, the wakeup time is set as the time (17:00) of the setting point of time in the register of the RTC.

At operation S5, it is determined whether or not a current time has reached 17:00 (the booting set time). When the current time reaches 17:00 in the next day, at operation S6, the RTC generates the control signal to the power controller 3, thereby controlling the power supply 2 to supply the electric power to the computer system 1 so as to start booting the computer system 1.

As the computer system 1 is booted, at the operation S7, the BIOS (the booting compensator 5) determines whether the booting start time (current time) is equal to the comparative set time stored in the BIOS ROM. When the booting start time is equal to the comparative set time, at the operation S12, the computer system 1 continues being booted.

Conversely, when the booting start time is different from the comparative set time, at the operation S8, the BIOS determines whether a difference between the comparative set time and the current time (17:00) is beyond the set limits. In this embodiment, because the comparative set time is scheduled to occur after six hours has elapsed from the booting start time (17:00), at the operation S9, 23:00 is stored as the booting set time, and then, at the operation S11, the computer system 1 stops being booted, and returns to the operation S5. At the operation S5, the RTC continues determining whether the current time reaches 23:00. When the current time reaches 11 P.M., the computer system 1 continues being booted. Here, if a predetermined program to be executed on the booting set time is set in the booting setting part 6, the program can be automatically executed after the computer system 1 is completely booted.

Figure 4:
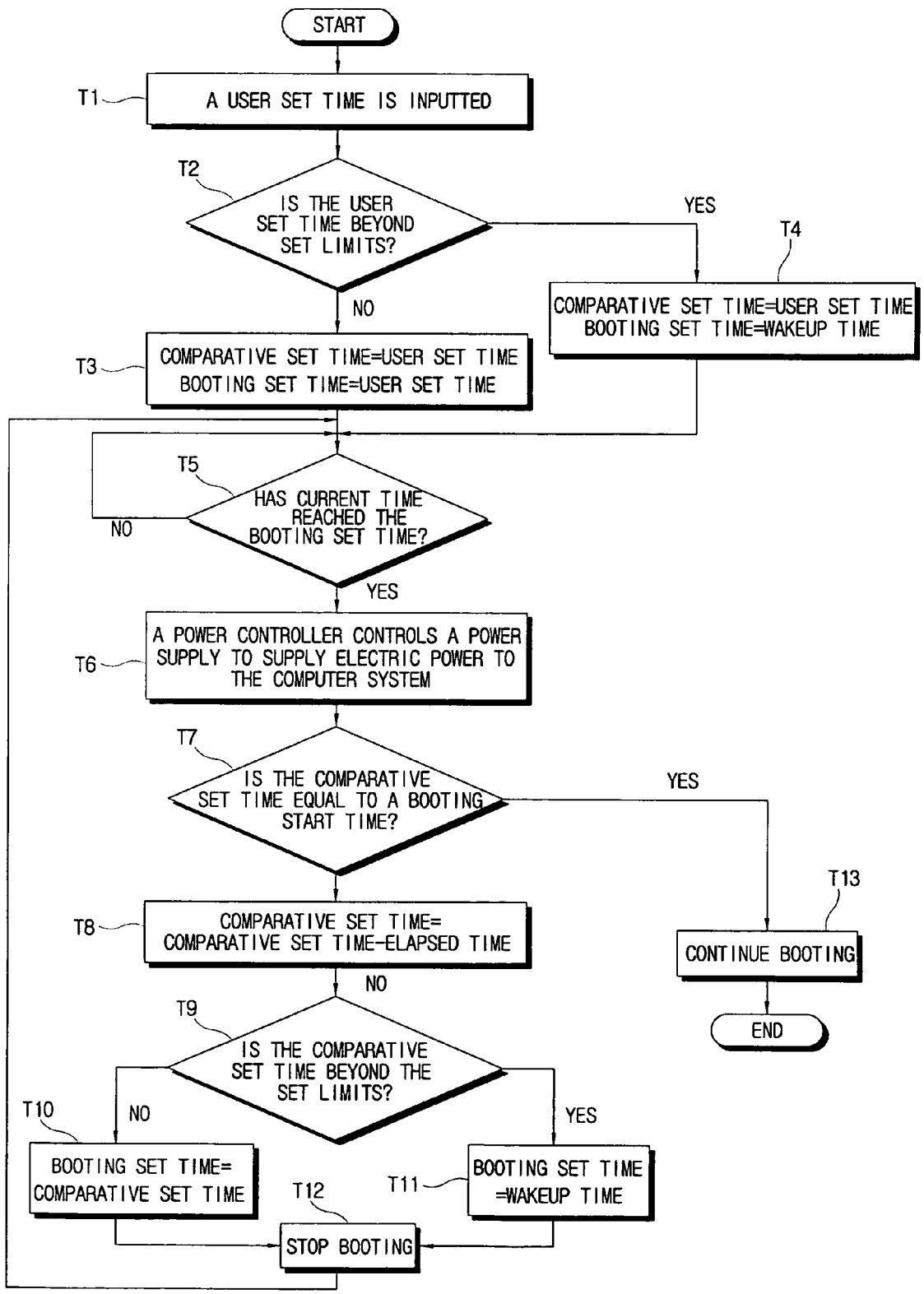
FIG. 4 is a flowchart of a booting method according to another embodiment of the present invention.

On the other hand, in the case where the comparative set time is not the absolute time, but the relative time from the user set time to the setting point of time, the booting compensator 5 should compensate the comparative set time when the booting start time is different from the user set time. That is, in the above embodiment, if the relative time from the setting point of time to the user set time, i.e., thirty hours is stored as the comparative set time instead of absolute date and time, the comparative set time is compensated into a difference between the setting point of time and an elapsed time. FIG. 4 illustrates this compensating process for the comparative set time in the case where the comparative set time is stored as the relative time.

Further, it should be appreciated that not only can the user set time be set beyond the set limits, but also the computer system may be turned off on the set time using the system and the method according to the present invention.

As described above, the present invention provides a computer system and a method of booting the same on a set time, in which the computer system employs a simple module such as an RTC having set limits, but the set time can be set beyond the set limits.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A computer system having a power supply to supply electric power, the computer system comprising:
   a power controller to control the power supply to supply the electric power to the computer system;
   a clock module, having predetermined set limits, to output a control signal to the power controller so that the power supply supplies the electric power to the computer system on a booting set time;
   a booting compensator to allow the computer system to continue being booted in response to a booting start time being equal to a comparative set time which is previously stored, and to compensate the booting set time so that it corresponds with the comparative set time, and to stop the booting of the computer system, in response to the booting start time being different from the comparative set time; and
   a booting setting part to receive a user set time from a user;
   wherein the booting setting part stores the user set time as the booting set time in the clock module, and as the comparative set time in the booting compensator, in response to the user set time being within the set limits, and stores the user set time as the comparative set time in the booting compensator, and a wakeup time within the set limits as the booting set time in the clock module, in response to the user set time being beyond the set limits.

2. The computer system of claim 1, wherein the booting compensator stores the comparative set time as the booting set time in response to the comparative set time being within the set limits, and stores the wakeup time as the booting set time in response to the comparative set time being beyond the set limits, in response to the booting start time being different from the comparative set time.

3. The computer system of claim 1, wherein the clock module comprises an RTC having a register to store the booting set time.

4. The computer system of claim 1, wherein the booting compensator is provided in a BIOS.

5. The computer system of claim 1, wherein the booting setting part receives information on the user set time together with a predetermined program selected by a user, so that the program can be executed after the computer system is completely booted.

6. The computer system of claim 1, wherein the wakeup time is set as the set limits of the clock module.

7. The computer system of claim 1, wherein the booting setting part is executed in a separate scheduling program in the computer system.

8. The computer system of claim 1, wherein the user set time is an absolute time and date.

9. The computer system of claim 1, wherein the user set time is a relative time to a point in time when the user set time is set.

10. The computer system of claim 1, wherein the booting setting part also stores a turn off time for the computer system.

11. A method of booting a computer system having a power supply to supply electric power, a power controller to control the power supply, an RTC to control the power controller to supply the electric power on a booting set time which is preset within predetermined set limits, and a BIOS, the method comprising:

receiving a user set time input by a user;

storing the user set time as the booting set time and as a comparative set time in the RTC and the BIOS, respectively, in response to the user set time being within the set limits, and storing the user set time as the comparative set time in the BIOS and a wakeup time within the set limits as the booting set time in the RTC in response to the user set time being beyond the set limits;

booting the computer system with the electric power as the RTC outputs a control signal on the booting set time;

comparing the booting set time with the comparative set time; and allowing the computer system to continue being booted in response to the booting set time being equal to the comparative set time.

12. The method of claim 11, wherein the comparing the booting set time with comparative set time comprises storing the comparative set time as the booting set time in response to the comparative set time being within the set limits, and storing the wakeup time as the booting set time in response to the comparative set time being beyond the set limits, in response to the comparative set time being different from the booting set time.

13. The method of claim 12, further comprising again booting the system on the booting set time and comparing the booting set time with the comparative set time in response to a current time reaching the booting set time.

14. The method of claim 11, wherein the comparing the booting set time with the comparative set time further comprises stopping the booting of the computer system in response to the comparative set time being different from the booting set time.

15. A computer system comprising:

a clock module with predetermined set limits;

a compensator;

a booting setting part to store a user set time as a comparative set time in the compensator;

wherein the booting setting part stores the user set time as a booting set time in the clock module in response to the user set time being within the set limits, and stores a time within the set limits as the booting set time in response to the user set time being beyond the set limits; and wherein the compensator allows the computer system to be booted at the booting set time in response to the booting set time being equal to the comparative set time, and compensates the booting set time so that it corresponds with the comparative set time in response to the booting start time being different from the comparative set time.

* * * * *